(12) United States Patent
Southam

(10) Patent No.: US 8,352,588 B2
(45) Date of Patent: Jan. 8, 2013

(54) SYSTEMS AND METHODS FOR COLLECTING DATA REGARDING NETWORK SERVICE OPERATION

(75) Inventor: Blaine R. Southam, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2514 days.

(21) Appl. No.: 10/617,002

(22) Filed: Jul. 9, 2003

(65) Prior Publication Data

US 2005/0021589 A1   Jan. 27, 2005

(51) Int. Cl.
*G06F 15/16* (2006.01)
*G06F 15/177* (2006.01)

(52) U.S. Cl. ........ 709/224; 709/213; 709/201; 709/214; 709/215; 709/216; 709/203; 709/208; 709/248; 709/220; 709/200; 713/323; 713/300; 713/324; 713/320; 713/322

(58) Field of Classification Search .............. 709/201, 709/218, 224, 203, 206, 213, 214, 215, 216, 709/208, 248, 220, 222, 200; 370/522, 244, 370/241; 379/142

See application file for complete search history.

(56) References Cited

U.S. PATENT DOCUMENTS

| | | | | |
|---|---|---|---|---|
| 6,085,234 A * | 7/2000 | Pitts et al. | ..... | 709/217 |
| 6,160,794 A * | 12/2000 | Malik et al. | ..... | 370/244 |
| 6,389,462 B1 * | 5/2002 | Cohen et al. | ..... | 709/218 |
| 6,665,705 B1 * | 12/2003 | Daniels-Barnes et al. | ..... | 709/203 |
| 6,678,793 B1 * | 1/2004 | Doyle | ..... | 711/133 |
| 6,832,366 B2 * | 12/2004 | Kouznetsov et al. | ..... | 717/106 |
| 7,127,492 B1 * | 10/2006 | Calo et al. | ..... | 709/214 |
| 2003/0212739 A1 * | 11/2003 | Boucher et al. | ..... | 709/203 |
| 2004/0003033 A1 * | 1/2004 | Kamen et al. | ..... | 709/203 |
| 2004/0064503 A1 * | 4/2004 | Karakashian et al. | ..... | 709/203 |
| 2004/0078424 A1 * | 4/2004 | Yairi et al. | ..... | 709/203 |
| 2004/0093580 A1 * | 5/2004 | Carson et al. | ..... | 717/101 |

* cited by examiner

*Primary Examiner* — Jude Jean Gilles

(57) ABSTRACT

Disclosed are systems and methods for collecting data regarding network service operation. In one embodiment, a system and a method pertain to intercepting a message directed to a network service, storing information about the message, and transmitting the message to a destination network service.

19 Claims, 6 Drawing Sheets

SYSTEMS AND METHODS FOR COLLECTING DATA REGARDING NETWORK SERVICE OPERATION

BACKGROUND

Network services, such as "web" services, are network-based applications that operate in a distributed computing environment to perform specific tasks in response to client requests. Currently, most such web services are focused on providing a variety of real world services, or information about such services, across the Internet.

To cite an example, a given web service may be designed to identify the cheapest long distance rates for a given client. In such a case, the client may provide various information to the web service such as a client identity, a city and state of residence, an indication of typical calling patterns, etc., and the web service will use that information to identify a service provider and/or calling plan that would cost the least for the client based upon the client-provided information. In making the determination as to which service provider and/or calling plan is best for the client, the web service may leverage the resources of one or more other web services, for instance hosted by one or more long distance service providers (e.g., AT&T™, Sprint™, MCI™, etc.). Specifically, the web service that was called upon by the client to return the best provider/plan may act in the capacity of a client relative to other web services in order to collect information from those services that is needed to make the provider/plan determination.

To ensure that a developed network service, as well as the network services it interacts with, is operating correctly it is desirable to collect data regarding communications that occur between network services. For instance, collecting information regarding the time at which a request was sent from the developed network service to another network service, as well as information as to the substance of the request, may be useful for purposes of profiling system operation, debugging service delivery problems, and identifying transmission and/or processing bottlenecks.

Currently, such information is collected by modifying the code of one or more of the network services to record this information. For instance, custom logging code may be integrated into a network service for the purpose of logging the information. Such insertion is highly invasive and normally requires substantial investment in terms of time and money for the development of the logging code and its integration into the network service. Moreover, even when a developer is willing to make such an investment, the developer may not have access to the network service code in the first place.

SUMMARY

Disclosed are systems and methods for collecting data regarding network service operation. In one embodiment, a system and a method pertain to intercepting a message directed to a network service, storing information about the message, and transmitting the message to a destination network service.

BRIEF DESCRIPTION OF THE DRAWINGS

The disclosed systems and methods can be better understood with reference to the following drawings. The components in the drawings are not necessarily to scale.

DETAILED DESCRIPTION

As described above, it is desirable to collect data regarding communications that occur between network services to evaluate how a developed network service, as well as the network services it interacts with, is operating. However, it is further desirable to collect such information in a non-invasive manner that does not require modification of the network service code and/or re-deployment of the network service.

As is discussed in the following, information as to network service operation can be collected by storing information about the messages that are sent from and received by a network service using a network proxy. In addition, network communications can be instrumented by the network proxy to facilitate the data collection process. With such information, system operation can be profiled and, if desired, the system can be reconfigured to improve performance and/or overcome problems (e.g., bugs, bottlenecks). Notably, the information may be collected in a testing environment to evaluate a network service prior to deployment, or may be used after deployment of the network service to ensure that the service is operating properly.

Figure 1:
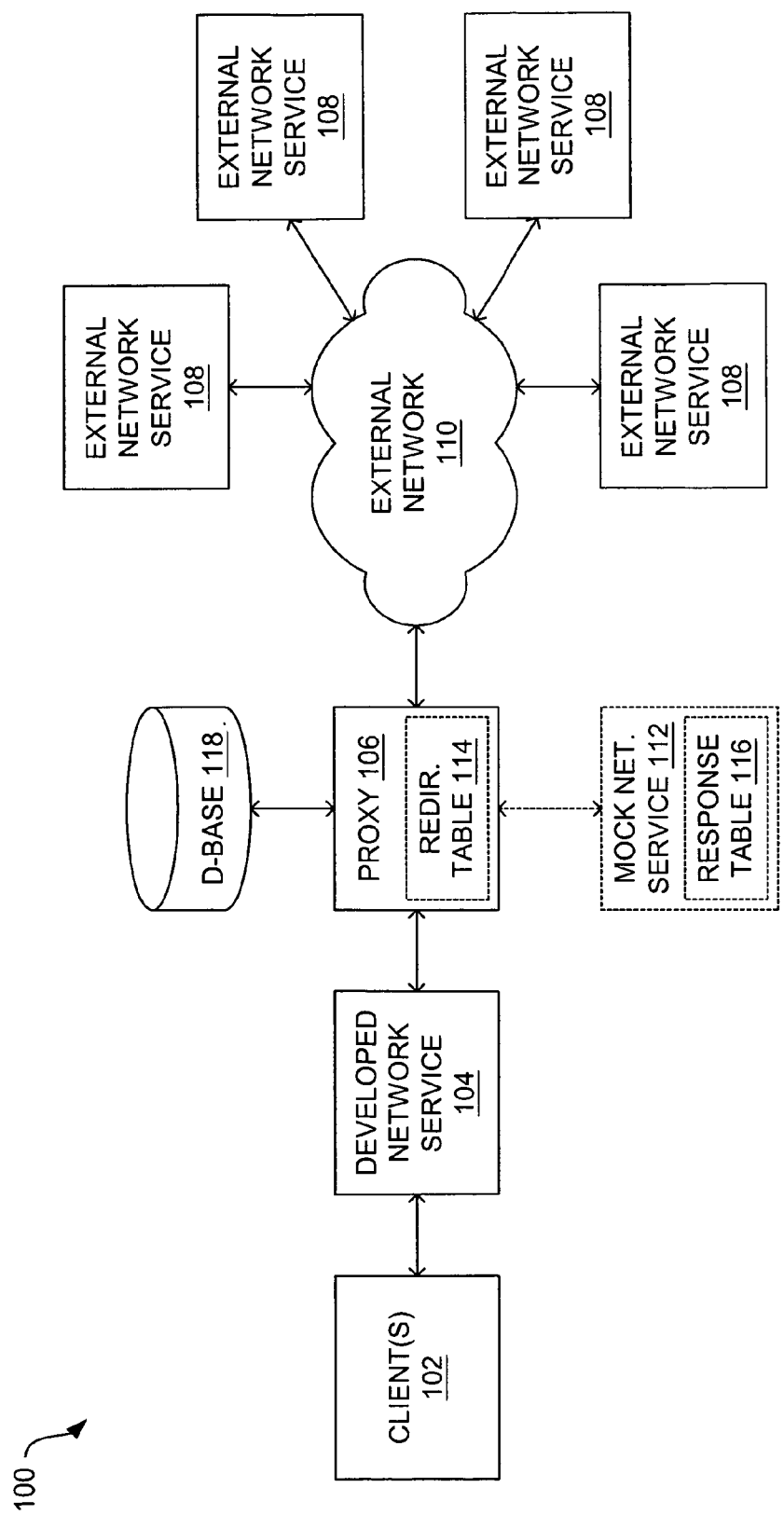
FIG. 1 is a schematic view of an embodiment of a system in which data regarding network service operation may be collected.

Referring now in more detail to the drawings, in which like numerals indicate corresponding parts throughout the several views, FIG. 1 illustrates an example system 100 in which network services may operate and information regarding this operation may be collected. As indicated in this figure, the system 100 generally comprises one or more clients 102, a developed network service 104, a network proxy 106, and one or more external network services 108 that are accessible to the network proxy via an external network 110.

The one or more clients 102 are configured to make requests of the developed network service 104. In situations in which the developed network service 104 is being tested (e.g., prior to deployment) the one or more clients 102 may comprise at least one mock client that is configured to emulate the operation of an actual requesting client. Regardless, the clients 102 may comprise a network browser, such as a web browser that is configured to communicate on the World Wide Web (i.e. the "Web") via hypertext transfer protocol (HTTP) and hypertext markup language (HTML), and/or an application comprising one or more user interfaces (UIs) that are used to collect information that is to be provided to the developed network service 104.

The developed network service 104 is a network service that, presumably, is the focus of the testing and/or system evaluation for which information is to be collected. The developed network service 104 may comprise a service that was developed and configured for utilization on the Web and, therefore, may comprise a "web" service. Regardless, the network service 104 is configured to both receive and supply content (i.e. static and/or dynamic content) over a network, such as the Internet. The network service 104 is typically configured to use standard Web protocols such as HTTP, HTML, extensible markup language (XML), and simple object access protocol (SOAP). As is known in the art, SOAP is a remote procedure call (RPC) and document exchange protocol used to request and reply to messages between web services. By way of example, the requests sent by the network service 104 comprise XML messages that are wrapped in SOAP envelopes and transmitted via HTTP.

The core functionality provided by the developed network service 104 depends upon the particular implementation. In most embodiments, however, the network service 104 is configured to communicate with other network services to satisfy requests made by the clients 102. By way of example, the developed network service 104 may comprise a service that identifies the least expensive telephone calling plan for the client, locates airline tickets that satisfy client-provided criteria (e.g., departure time, arrival time, cost, etc.), determines the most appropriate form of shipping based upon client requirements (e.g., airmail, next day delivery, etc.), identifies hotels that can accommodate a client itinerary, or the like.

The developed network service 104 may be configured (i.e. hard-coded) to interact with one or more of the external network services 108. For the purposes of this disclosure, the term "external network service" identifies a network (e.g., web) service that has been deployed for, normally public, use on a given network, such as the Internet. By way of example, the external network services 108 comprise web services that are hosted by third parties, such as those parties that provide services that the client is seeking (e.g., telephone services, plane ticket reservations, shipping services, hotel accommodations, etc.). Such external network services 108 may be contrasted with mock network services 112 that, in the testing scenario, may be provided to emulate the functionality of the external network services and which are controlled by those conducting the network service testing.

In a testing situation, unintended interaction between the developed network service 104 and the external network services 108 may be prevented using the network proxy 106. For instance, the network proxy 106 may be configured to redirect certain communications (i.e. requests) sent from the developed network service 104 and directed to one or more of the external network services 108. In such a case, the network proxy 106 may comprise, or may be configured to access, a redirection table 114 (or other data structure) that maps network addresses (e.g., universal resource locators (URLs)) of various external network services 108 to network addresses (e.g., URLs) of mock network services 112 that emulate the operation of those external network services. Examples of the network proxy 106 operating in this redirection capacity are described in U.S. patent application Ser. No. 10/615,547 entitled "Systems and Methods for Testing Network Services", filed Jul. 8, 2003, which is hereby incorporated by reference in its entirety into this disclosure.

When provided, the mock network services 112 comprise generic, data-driven code. Therefore, the mock network services 112 do not actually comprise the business logic of the external network services 108 that they emulate, and do not actually process requests as do the external network services. Instead, the mock network services 112 merely receive inputs, in the form of requests, and transmit outputs, in the form of responses to the requests. As indicated in FIG. 1, the mock network services 112 include, or may access, a response table 116 (other data structure) that defines the operation of the service. The table 116 of each service 112 maps a number of predefined requests to a corresponding number of pre-configured responses such that, when a mock network service 112 receives a request from the developed network service 104 (due to redirection by the network proxy 106), the received request is compared to information stored within the table or other data structure, and that information is mapped to one of several pre-configured responses. The corresponding response may then be transmitted to the developed network service 104, for example, via the network proxy 106. The responses, like the requests, may comprise XML messages that are wrapped in a SOAP envelope and transmitted via HTTP.

As is apparent from the foregoing, all requests and responses sent from and received by the developed network service 104 are typically routed through the network proxy 106. Assuming HTTP is employed, a socket may be opened in the network proxy 106 in transmitting a request to a network service 108, 112. In such a case, the socket is closed when the response is received from the network service 108, 112 and relayed back to the developed network service 104. Alternatively, responses may be transmitted directly from a network service 108, 112 to the developed network service 104 in the event a protocol other than HTTP is employed, or if the execution of HTTP with respect to the network proxy 106 is altered. In such a case, a socket opened by the network proxy 106 in sending a request to a network service 108, 112 is closed even though a response was never received therefrom.

In some embodiments, the network proxy 106 comprises a conventional proxy (e.g., Web proxy server) of the type through which network traffic for a given network (e.g., local area network (LAN)), for instance behind a firewall, and that may be used to filter incoming traffic and/or cache local copies of Web objects (e.g., Web pages, files, images) to reduce network latency and traffic. In such a case, however, the network proxy 602 is modified to, as described above, redirect communications to mock network services and/or, as described below, facilitate collection of information that pertains to network service operation.

Use of a conventional proxy as the basis for the network proxy 106 is convenient in that such proxies "see" all network traffic in conventional applications anyway. Notably, where only the redirection functionality and/or information collection functionality is/are desired, the network proxy 106 need not comprise filtering or caching capabilities. The network proxy 106 can be written in substantially any language including, for example, Java and C. A Java implementation may be desirable in some cases in that Java enables transmission of HTTP requests to the network proxy 106.

As is further illustrated in FIG. 1, the system 100 includes a database 118 that is accessible by the network proxy 106 (or which forms part of the proxy). As is described in greater detail below, the network proxy 106 is configured to store in the database 118 information regarding communications that are sent from and sent to the developed network service 104.

Figure 2:
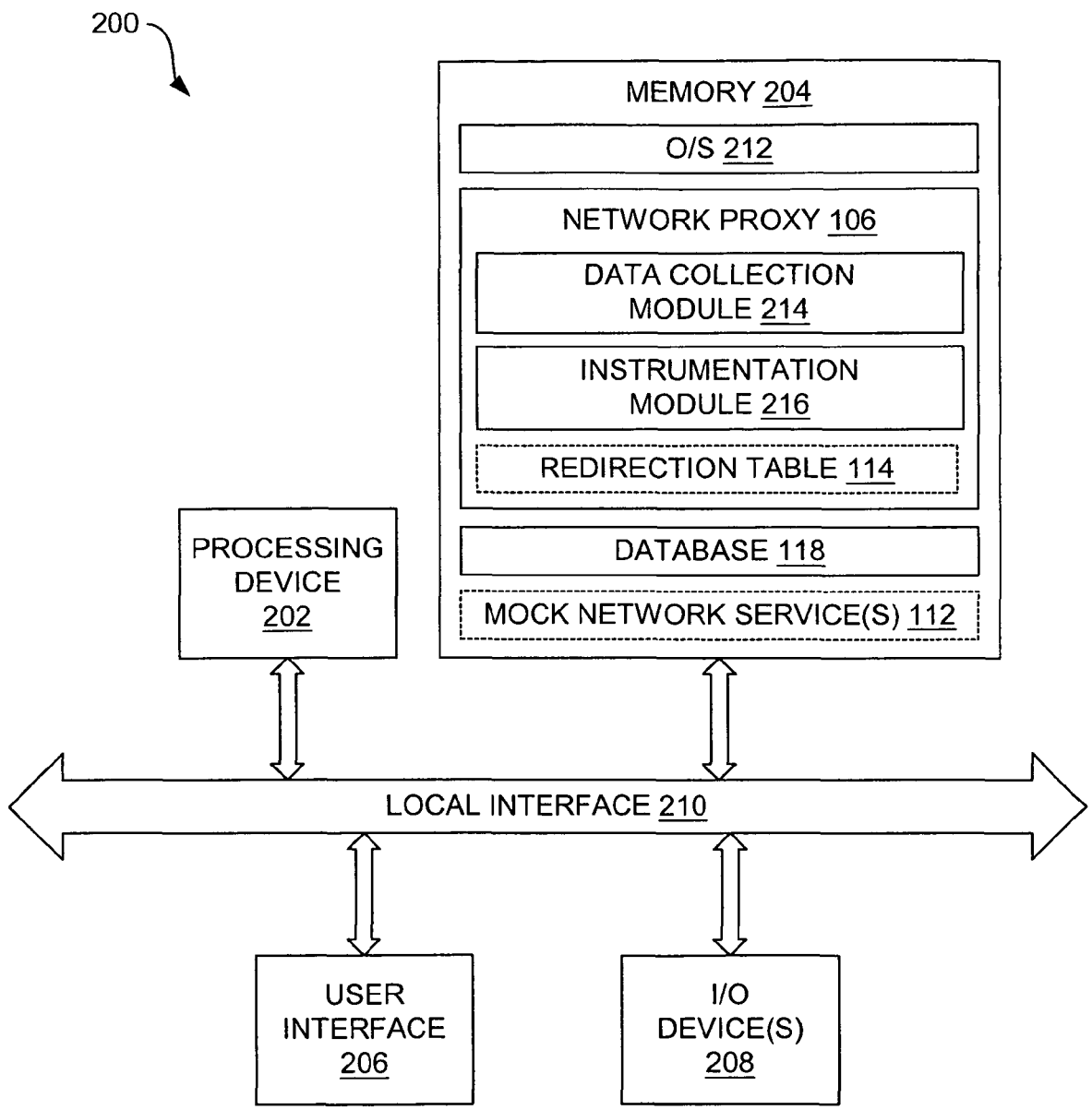
FIG. 2 is a block diagram of an embodiment of a computing device on which a network proxy of the system of FIG. 1 can execute.

FIG. 2 is a schematic view of an example architecture for a computing device 200 on which the network proxy 106, as well as other system components, can execute. As indicated in FIG. 2, the computing device 200 comprises a processing device 202, memory 204, a user interface 206, and one or more input/output (I/O) devices 208, each of which is connected to a local interface 210.

The processing device 202 can include a general-purpose processor, a microprocessor, one or more application-specific integrated circuits (ASICs), a plurality of suitably configured digital logic gates, or other electrical configurations comprised of discrete elements that coordinate the overall operation of the computing device 200.

The memory 204 includes any one of a combination of volatile memory elements (e.g., random access memory (RAM)) and nonvolatile memory elements (e.g., hard disk, read only memory (ROM), Flash memory, etc.).

The user interface 206 comprises the components with which a user can interact with the computing device 200. For example, where the computing device 200 comprises a personal computer (PC) or similar computer, these components can comprise, for instance, a keyboard, mouse, and a display.

With further reference to FIG. 2, the one or more I/O devices 208 comprise components that are adapted to facilitate connection of the computing device 200 to another device and may therefore include one or more serial, parallel, small computer system interface (SCSI), universal serial bus (USB), IEEE 1394 (e.g., Firewire™), or other communication components. In addition, the I/O devices 208 comprise the various components used to transmit and/or receive data over a network. By way of example, such components include one or more of a modulator/demodulator (e.g., modem), wireless (e.g., RF) transceiver, and/or a network card.

The memory 204 comprises various programs, in software and/or firmware, including an operating system (O/S) 212 and the network proxy 106. The O/S 212 controls the execution of other software and provides scheduling, input-output control, file and data management, memory management, and communication control and related services. Optionally, the O/S 212 may incorporate or support a virtual machine, such as a JVM, on which the network proxy 106 executes.

The network proxy 106 comprises a data collection module 214 that is configured to collect data about messages sent to and from the developed network service 104, and an instrumentation module 216 that is configured to instrument communications that are transmitted from the developed network service (e.g., to another network service). Examples of operation of the network proxy 106, and therefore the data collection module 214 and the instrumentation module 216, are discussed below in relation to FIGS. 3 and 4. In addition to those modules, the network proxy 106, as mentioned above, may comprise a redirection table 114 that is used to redirect communications (e.g., service requests) to one or more mock network services 112.

As is further indicated in FIG. 2, the memory 204 may further comprise the database 118 and the one or more mock network services 112 identified in FIG. 1. Although those components are shown as executing on the computing device 200, one or more of those components can execute on one or more other computing devices (e.g., PC or server), if desired.

Various programs (i.e. logic) have been described herein. These programs can be stored on any computer-readable medium for use by or in connection with any computer-related system or method. In the context of this document, a "computer-readable medium" is any electronic, magnetic, optical, or other physical device or means that contains or stores a computer program for use by or in connection with a computer-related system or method. These programs can be used by or in connection with an instruction execution system, apparatus, or device, such as a computer-based system, processor-containing system, or other system that can fetch the instructions from the instruction execution system, apparatus, or device and execute the instructions.

Example systems having been described above, examples of system operation will now be discussed in relation to FIGS. 3A and 3B. It is noted that process steps or blocks in the flow diagrams of this disclosure may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 3A:
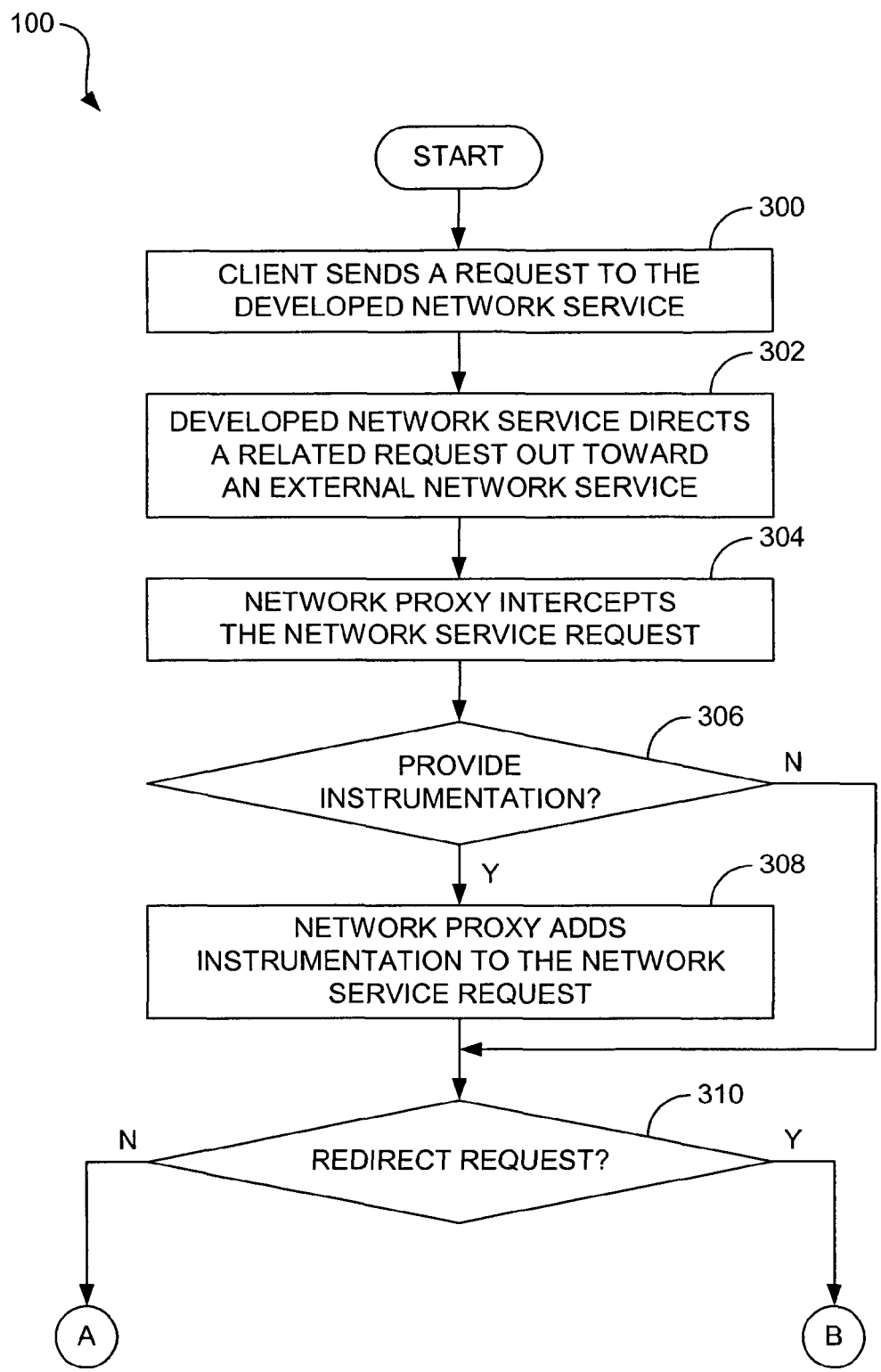
FIG. 3 is a flow diagram that illustrates an embodiment of operation of the system of FIG. 1 and data collection activities.
Figure 3B:
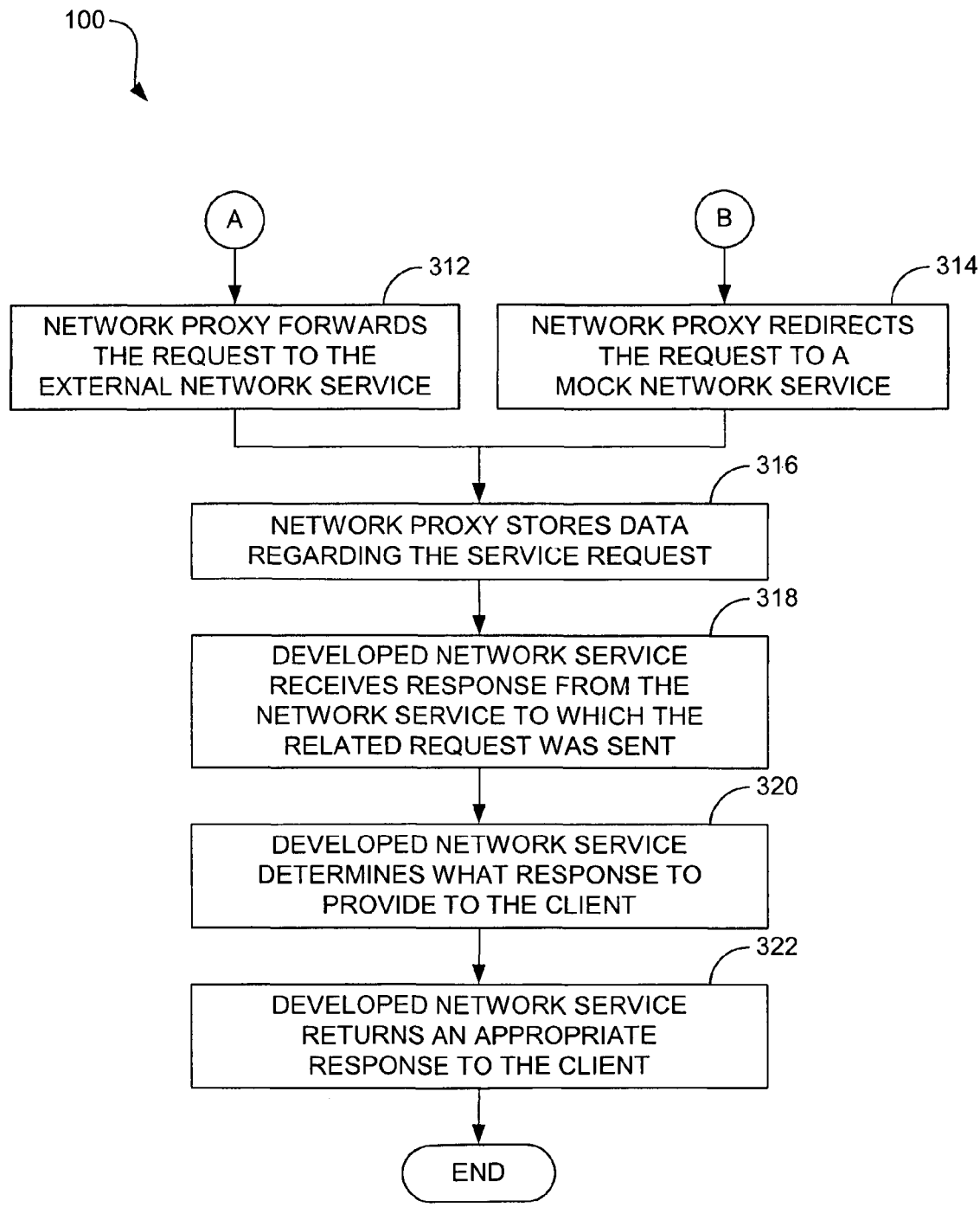

With reference to block 300 of FIG. 3A, the client 102 first sends a request to the developed network service 104. After the request is received, the developed network service 104 directs a related request to an external network service 108, as indicated in block 302. Because of the presence of the network proxy 106, the request is intercepted, as indicated in block 304. Once having intercepted the request, the network proxy 106 can perform various actions both related to request redirection and data collection.

Referring next to decision block 306, the network proxy 106 determines whether to provide instrumentation to the intercepted request before it is delivered to a further network service. As is described in greater detail below, such instrumentation can, for example, comprise information regarding the substance of the request as well as information as to when the request was (ultimately) transmitted by the network proxy 106 to the other network service. If no such instrumentation is to be provided, flow continues to decision block 310 described below. If, on the other hand, the request is to be instrumented, flow continues on to block 308 at which the network proxy 106 adds instrumentation information to the network service request.

With reference to decision block 310, the network proxy 106 next determines whether to redirect the request to a mock network service 112. For instance, in the testing scenario, it may be desirable to redirect communications intended for external network services 108 to the mock network service(s) 112, which emulate(s) the external network services to, for example, avoid incurring charges associated with interacting with the external network services. If no such redirection is to be performed (e.g., the developed network service 106 is not merely being tested), flow continues to block 312 of FIG. 3B at which the network proxy 106 forwards the request to the external network service 108 for which the related request was intended. However, if redirection is warranted (e.g., in the testing/development scenario), flow continues to block 314 of FIG. 3B at which the network proxy 106 redirects the request to a mock network service 112 that will emulate the operation of the intended external network service 108.

When the related request is forwarded (block 312) or redirected (block 314), the network proxy 106 stores data regarding the service request, as indicated in block 316. The nature of the data that is stored may vary with the system implementation. By way of example, however, the network proxy 106 stores data regarding the substance of the request and information as to when the request was transmitted by the network proxy to the destination network service. Therefore, the data stored in block 316 may comprise the same data or data similar to that which was added by instrumenting the request (block 308 of FIG. 3A).

After the related request has been received by the destination network service (an external network service 108 and/or a mock network service 112), that network service determines what response to provide and, once that response is transmitted, the developed network service 104 receives the response, as indicated in block 318. Notably, the response can first be routed through the network proxy 106 (not indicated). In such a case, the network proxy 106 may perform other data collection activities, as described below. Once the response is received by the developed network service 104, the developed network service determines what response to then provide to the client 102, as indicated in block 320, and, as indicated in block 322, sends an appropriate response to the client to complete the flow for the request session.

Figure 4:
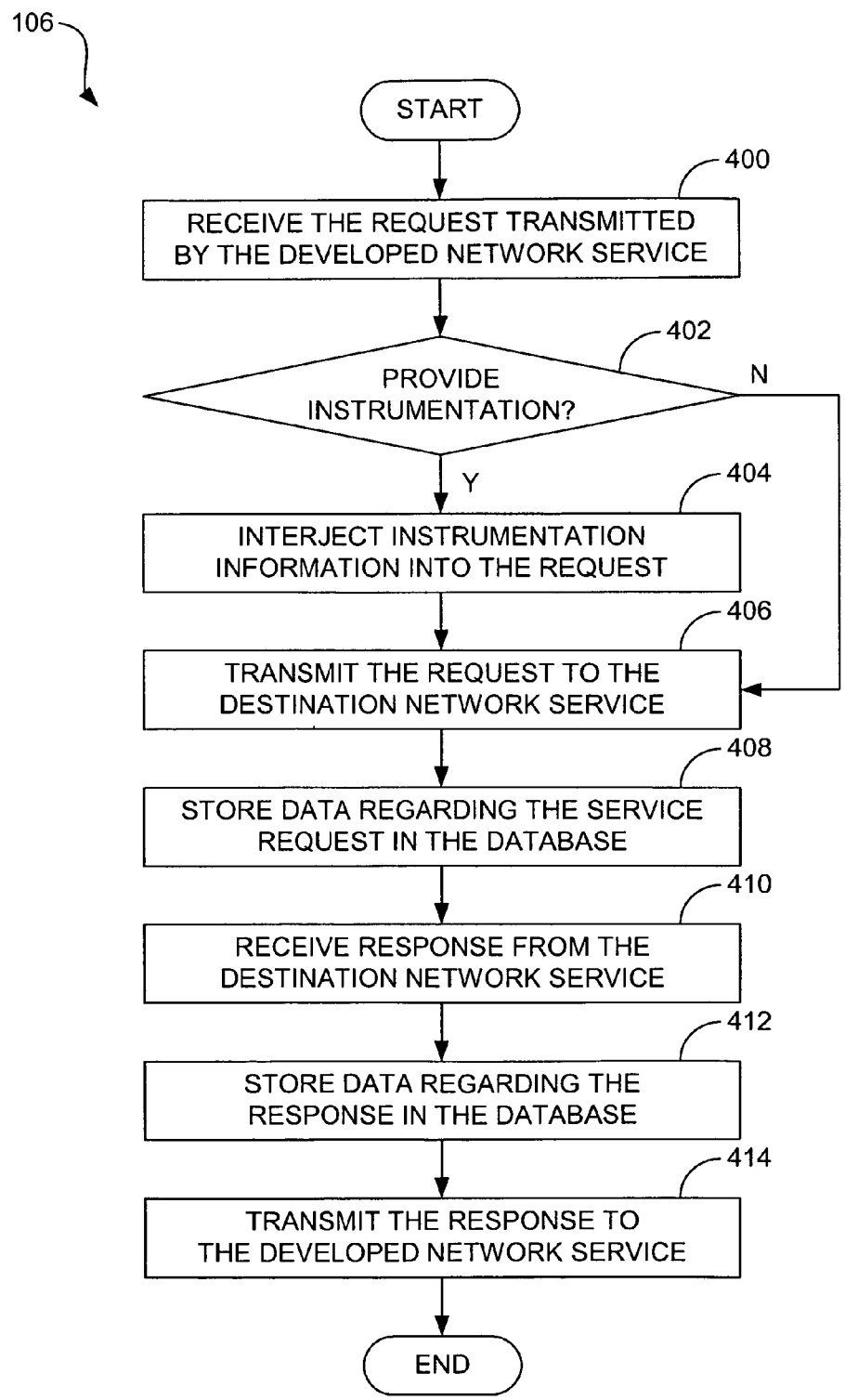
FIG. 4 is a flow diagram that illustrates an embodiment of operation of a network proxy of the system of FIG. 1 in facilitating data collection regarding network service operation.

FIG. 4 provides an example of operation of the network proxy 106 in facilitating data collection. Beginning with block 400 of that figure, the network proxy 106 first receives a request transmitted by the developed network service 104. By way of example, the request comprises at least one XML message wrapped in a SOAP envelope. Once the request is received, the network proxy 106 determines whether to provide instrumentation to the intercepted request before it is delivered to a further network service (i.e., the destination network service). This determination can be made with reference to settings that have been hard-coded into the proxy 106, or that have been selected by a user (e.g., system administrator) for the request session.

In some cases, the determination as to whether to instrument the request may further be made in relation to the operational behavior of the destination network service. Specifically, the determination may be made in light of whether the destination network service will preserve or disregard the instrumentation information. For instance, it may be desirable to add instrumentation information in situations in which the destination network service is configured to extract the instrumentation information from the received request and add it to the response that is returned back to the developed network service 104. In such a case, information regarding the entire request session (i.e. the related request and the response to that request) can be obtained and analyzed. Moreover, it may be desirable to add the instrumentation information to the request even if it will not be returned by the destination network service in that the information may be considered useful to the host of that destination network service and, therefore, may be used to provide feedback to the administrator of the developed network service 104.

If, at decision block 402, the network proxy 106 determines that instrumentation is not to be provided to the request, flow continues down to block 406 described below. If such instrumentation is to be provided, however, flow continues to block 404 at which the network proxy 106 interjects instrumentation information into the request. In cases in which the request comprises a SOAP message (e.g., an XML message wrapped in a SOAP envelope), the instrumentation information may be inserted in a header of the message. Regardless, the information that is interjected can comprise any information about the request that the administrator of the developed network service 104 or another operator (e.g., host of the external network service 108) may consider valuable. By way of example, the interjected instrumentation information comprises information as to the time the request was received by the network proxy 106, the identity of the "client" (e.g., developed network service 104) that made the request, the identity of the destination network service (e.g., external network service 108) to which the request is directed or to which the request will be redirected, the time at which the request was transmitted from the network proxy, and information about the nature of the request (e.g., the type of request being transmitted or a portion or the entirety of the message).

Irrespective of whether the request is instrumented or not, the network proxy 106 next transmits the request to the destination network service, as indicated in block 406. As noted above in relation to FIG. 3B, this transmission can be to an external network service 108 that was identified by the developed network service 104 or a mock network service 112 that will emulate the operation of the intended external network service 108, depending upon the underlying circumstances.

Simultaneous to that transmission or thereafter, the network proxy 106 stores data regarding the service request in the database 118, as indicated in block 408. Again, this data can be similar or the same as the data that was interjected into the request as described above. Accordingly, the data stored in the database may comprise, for instance, information as to the time the request was received by the network proxy 106, the identity of the client that made the request, the identity of the destination network service to which the request was transmitted, the time at which the request was transmitted, and information about the nature of the request. By storing this information in the database 118, some information about the request session will be available for evaluation even if the destination network service does not return such information with its response. For example, the time that passed between transmission of the request and receipt of the response to that request may be determined to obtain information indicative of network latency and/or destination network service processing time.

In this example, it is assumed that responses from the destination network service to the developed network service 104 are routed through the network proxy 106 for purposes of collecting further data. In such a case, the response from the destination network service (e.g., external network service 108 and/or mock network service 112) is received by the proxy 106, as indicated in block 410. At this point, data regarding the received response may again be stored in the database 118 by the network proxy 106, as indicated in block 412. By way of example, this data may comprise information as to the time the response was received by the proxy 106, the identity of the network service that provided the response, and the substance of the response itself (e.g., a portion or the entirety of the received message). In situations in which the destination network service is configured to interject its own instrumentation information into the response, the information stored by the network proxy may further comprise the time that the response was transmitted from the destination network service. Moreover, in cases in which the destination network service is configured to extract the instrumentation information provided in the request sent by the network proxy 106 and append it to the response, the network proxy may further store information regarding the time that the request was received by the destination network service. Information provided by the destination network service in the response may be obtained by the network proxy 106 from, for example, a header of the response. Once all data has been stored in the database 118, or simultaneous to that storage, the network proxy 106 transmits the received response to the developed network service 104, as indicated in block 414, so that that service may return an appropriate response to the requesting client 102.

As can be appreciated from the above discussion, the storage of data and/or the instrumentation of service requests enables a user (e.g., service administrator) to obtain information regarding the messaging interactions between network services. Depending upon the nature of the data that is collected and/or instrumented, information as to network latency and destination network service processing time may be gleaned. Furthermore, such information may be obtained relative to the particular requests that are transmitted. For instance, it may be determined from the information that some requests (e.g., determining hotel availability) require a large amount of time to receive a response while other requests (e.g., determining flight availability) may require less. In such a case, investigations may be performed to determine whether that phenomenon is occurring due to a flaw in the system (e.g., in the developed network service 104 or the destination network service). Additionally, because the substance of the requests and the responses are stored, the accuracy of system operation may be analyzed.

Figure 5:
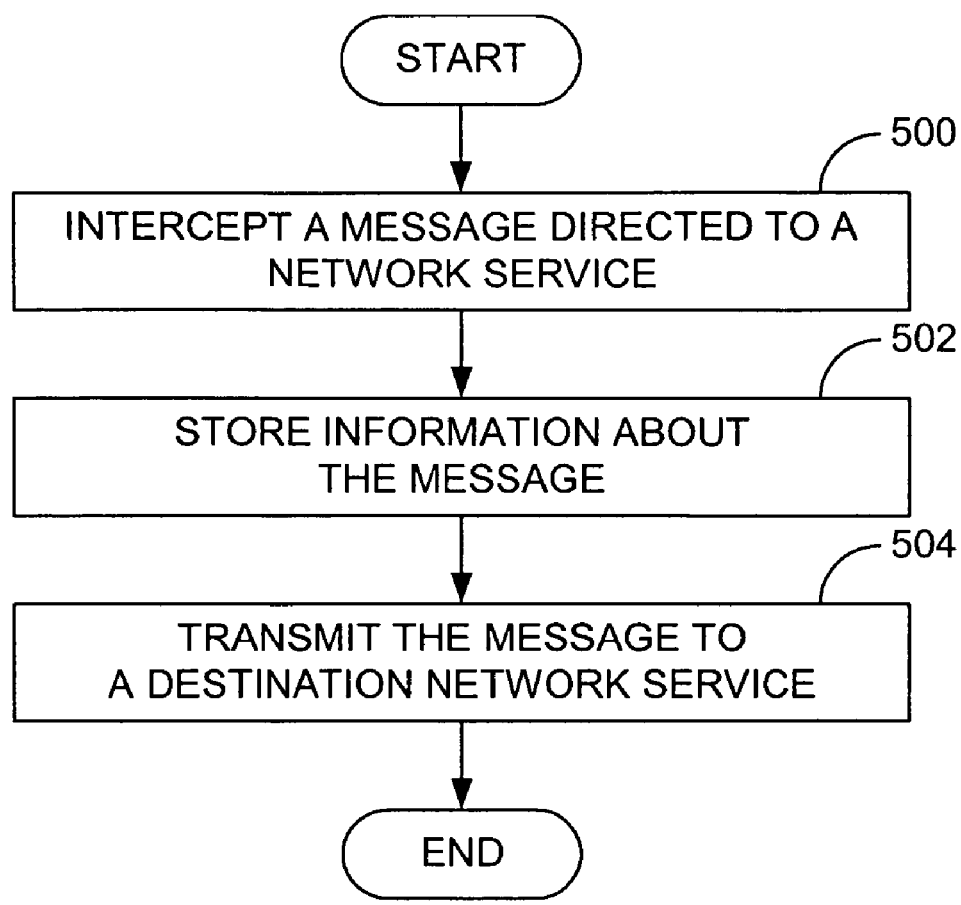
FIG. 5 is a flow diagram that summarizes an embodiment of operation of the network proxy.

From the above disclosure, the operation of the network proxy 106 can be summarized as indicated in FIG. 5. Beginning with block 500 of FIG. 5, the network proxy 106 intercepts a message directed to a network service. By way of example, that message is a request sent by the developed network service 104 and comprises an XML message wrapped in a SOAP envelope. Next, the network proxy 106 stores information about the message, as indicated in block 502. Examples of the types of information that may be stored are described in the foregoing. In addition, the network proxy 106 transmits the message to a destination network service (block 504), which may comprise an external network service 108 or a mock network service 112. In addition to the above actions, the network proxy 106 can further instrument the message prior to transmitting it (not shown). The information with which the message is instrumented may comprise information that is similar to or the same as the information that is stored at block 502.

What is claimed is:

1. A method for collecting data regarding service operation, the method comprising:
   a client directing a web protocol message to a web service on the Internet;
   a network proxy intercepting the web protocol message before it reaches the web service;
   the network proxy storing profiling information about the web protocol message in a database that is separate from the web service, the profiling information including a time the message was received by the network proxy;
   the network proxy transmitting the web protocol message to a destination web service; and
   the network proxy storing a time at which the web protocol message was transmitted to the destination network service.

2. The method of claim 1, wherein intercepting the web protocol message comprises intercepting the web protocol message sent by a developed web service that executes on a client computer.

3. The method of claim 1, wherein intercepting the web protocol message comprises intercepting the web protocol message using a network proxy that executes on a computer that is intermediate a computer on which the client executes and a computer on which the web service executes.

4. The method of claim 1, wherein storing information about the web protocol message comprises storing information about at least one of an identity of the client that sent the message, an identity of the web service, and information about the substance of the message.

5. The method of claim 1, wherein transmitting the web protocol message to a destination web service comprises transmitting the web protocol message to the web service on the Internet.

6. The method of claim 1, wherein transmitting the web protocol message to a destination web service comprises transmitting the web protocol message to a mock web service that emulates operation of the web service on the Internet.

7. The method of claim 1, comprising the network proxy interjecting instrumentation information into the web protocol message prior to transmitting the web protocol message to the destination web service, the instrumentation information being useful in profiling system operation.

8. The method of claim 7, wherein interjecting instrumentation information comprises adding instrumentation information to a header of the web protocol message.

9. The method of claim 7, wherein interjecting instrumentation information comprises interjecting at least one of the time the web protocol message was received, an identity of the client computer that sent the web protocol message, an identity of the destination network service, the time at which the web protocol message was transmitted to the destination network service, and information about the substance of the message.

10. The method of claim 9, comprising the network proxy receiving a response from the destination web service and storing profiling data regarding the response in the database.

11. The method of claim 10, wherein storing data regarding the response comprises storing at least one of a time the response was received, an identity of the destination network service, a time that the message transmitted to the destination network service was received, and a time that the response was transmitted by the destination network service.

12. A computer that stores a network proxy, the proxy comprising:
   logic configured to intercept web protocol messages directed by a client to a web service that executes on a separate computer on the Internet before the web protocol messages reach the web service;
   logic configured to store in a database that is separate from the web service profiling information about the web protocol message, the profiling information including a time the web protocol message was received by the network proxy;
   logic configured to transmit the web protocol message to a destination network service;
   logic configured to store a time at which the web protocol message was transmitted to the destination network service;
   logic configured to store a time at which a response was received from the destination network service; and
   logic configured to determine information regarding network interactions based upon the preceding stored parameters.

13. The computer of claim 12, wherein the logic configured to store information about the web protocol message comprises logic configured to store information about at least one of an identity of a client computer that sent the web protocol message, an identity of the web service, and information about a substance of the web protocol message.

14. The computer of claim 12, wherein the logic configured to transmit is configured to transmit the web protocol message to one of the web service and a mock web service that emulates operation of the web service.

15. The computer of claim 12, comprising logic configured to interject instrumentation information into the web protocol message.

16. The computer of claim 15, wherein the logic configured to interject instrumentation information comprises logic configured to add instrumentation information to a header of the web protocol message.

17. The computer of claim 15, wherein the logic configured to interject instrumentation information comprises logic configured to interject at least one of the time the web protocol message was received, an identity of a client computer that sent the web protocol message, an identity of the web service, and information about a substance of the web protocol message.

18. The computer of claim 12, comprising logic configured to receive a response from the destination web service and logic configured to store in the database profiling data regarding the response.

19. The computer of claim 18, wherein the logic configured to store data regarding the response comprises logic configured to store at least one of an identity of the destination network service, a time that the web protocol message transmitted to the destination network service was received, and a time that the response was transmitted by the destination network service.

* * * * *